(12) United States Patent
Lai

(10) Patent No.: US 6,279,263 B1
(45) Date of Patent: Aug. 28, 2001

(54) ARTIFICIAL CULTIVATING ROOM AND METHOD FOR CULTIVATING PLANTS

(76) Inventor: Chieh-Chou Lai, 9F-9, No. 144, Sec. 3, Sun-Ming Road, Taichung (TW)

(*) Notice: Subject to any disclaimer, the term of this patent is extended or adjusted under 35 U.S.C. 154(b) by 0 days.

(21) Appl. No.: 09/382,647

(22) Filed: Aug. 25, 1999

(51) Int. Cl.[7] .................................................. A01G 31/02
(52) U.S. Cl. .................................................. 47/65; 47/18
(58) Field of Search .................................. 47/17, 39, 65

(56) References Cited

U.S. PATENT DOCUMENTS

| | | | |
|---|---|---|---|
| 3,925,928 | * 12/1975 | Constantinescu et al. | 47/17 |
| 4,255,897 | * 3/1981 | Ruthner | 47/65 |
| 4,292,762 | * 10/1981 | Fogg et al. | 47/17 |
| 4,513,531 | * 4/1985 | Lestraden | 47/39 |
| 4,514,929 | * 5/1985 | Lestraden | 47/17 |
| 5,675,932 | * 10/1997 | Mauney | 47/62 R |

* cited by examiner

Primary Examiner—Charles T. Jordan
Assistant Examiner—Francis T. Palo
(74) Attorney, Agent, or Firm—Charles E. Baxley

(57) ABSTRACT

An isolated artificial cultivating room includes a number of cultivating frames each having a number of vertically spaced growth plates for plants. A cultivating device is provided for each cultivating frame and movable under automatic control for supplying water, fertilizer, pesticide, and sunlight to the plants on each growth plate. Growth of the plants is not affected by natural environment and damage to the plants by bugs is reduced. Production and quality of the plants can be planned and assured.

14 Claims, 5 Drawing Sheets

ARTIFICIAL CULTIVATING ROOM AND METHOD FOR CULTIVATING PLANTS

BACKGROUND OF THE INVENTION

1. Field of the Invention

The present invention relates to an artificial cultivating room having a plurality of multistory frames each consisting of a plurality of vertically spaced growth plates for cultivating various plants. The present invention also relates to a method for automatically cultivating plants on a plurality of vertically spaced growth plates in an artificial cultivating room.

2. Description of the Related Art

Plant cultivation is limited by the proper land area for cultivation even though farm machinery has been developed. In addition, labor still plays an important role in plant cultivation. Harvest of cultivation dependents largely upon weather condition. All of these indicate a long and unfulfilled need for automatic control in plant cultivation in a multistory frame.

SUMMARY OF THE INVENTION

It is a primary object of the present invention to provide an artificial cultivating room having a plurality of multistory frames each consisting of a plurality of vertically spaced growth plates for cultivating various plants. Water, fertilizers, and pesticides are supplied to each growth plate for cultivating plants on the growth plates.

It is another object of the present invention to provide a method for automatically cultivating plants on a plurality of vertically spaced growth plates in an artificial cultivating room. Water, fertilizers, and pesticides are automatically supplied to each growth plate for cultivating plants on the growth plates. In addition, temperature and moisture in the artificial cultivating room can be automatically controlled in response to the plants to be reared.

An artificial cultivating room in accordance with the present invention comprises:

an isolated cultivating room;

at least one cultivating frame mounted in the cultivating room and including a plurality of vertically spaced growth plates for rearing plants thereon;

at least one cultivating device movable relative to said at least one cultivating frame, said at least one cultivating device including a water tube, a nutrition tube, and a sun lamp for each said growth plate; and means for moving said at least one cultivating device relative to said at least one cultivating frame.

The cultivating room may be constructed to prevent transmission of light. The cultivating frame includes a track means on a top thereof The moving means includes a plurality of wheels mounted on the cultivating device and engaged with the track means. The cultivating device includes an inverted U-shaped frame constructed by a plurality of vertical rods and a plurality of horizontal rods. The inverted U-shaped frame further includes a plurality of pairs of support plates for supporting the water tube, the nutrition tube, and the sun lamp for each growth plate.

The water tubes of the cultivating device may be intercommunicated by a guide tube that has valve means for controlling opening and closing of the water tubes. The nutrition tubes of the cultivating device may also be intercommunicated by a guide tube that has valve means for controlling opening and closing of the nutrition tubes.

In an embodiment of the invention, there are a plurality of cultivating frames and a plurality of cultivating devices in the isolated room, wherein all of the cultivating devices are moved simultaneously. In addition, a computer is provided for controlling movement of the cultivating devices and opening and closing of the water tubes, the nutrition tubes, and the sun lamps.

A method for cultivating plants in accordance with the present invention comprises:

providing an isolated cultivating room having at least one cultivating frame therein, said at least one cultivating frame including a plurality of vertically spaced growth plates for plants;

providing at least one cultivating device to said at least one cultivating frame, said at least one cultivating device being movable relative to said at least one cultivating frame, said at least one cultivating device including a water tube, a nutrition tube, and a sun lamp for each said growth plate; and providing a computer electrically connected to said at least one cultivating device for controlling movement of said at least one cultivating device and opening and closing of the water tubes, the nutrition tubes, and the sun lamps.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
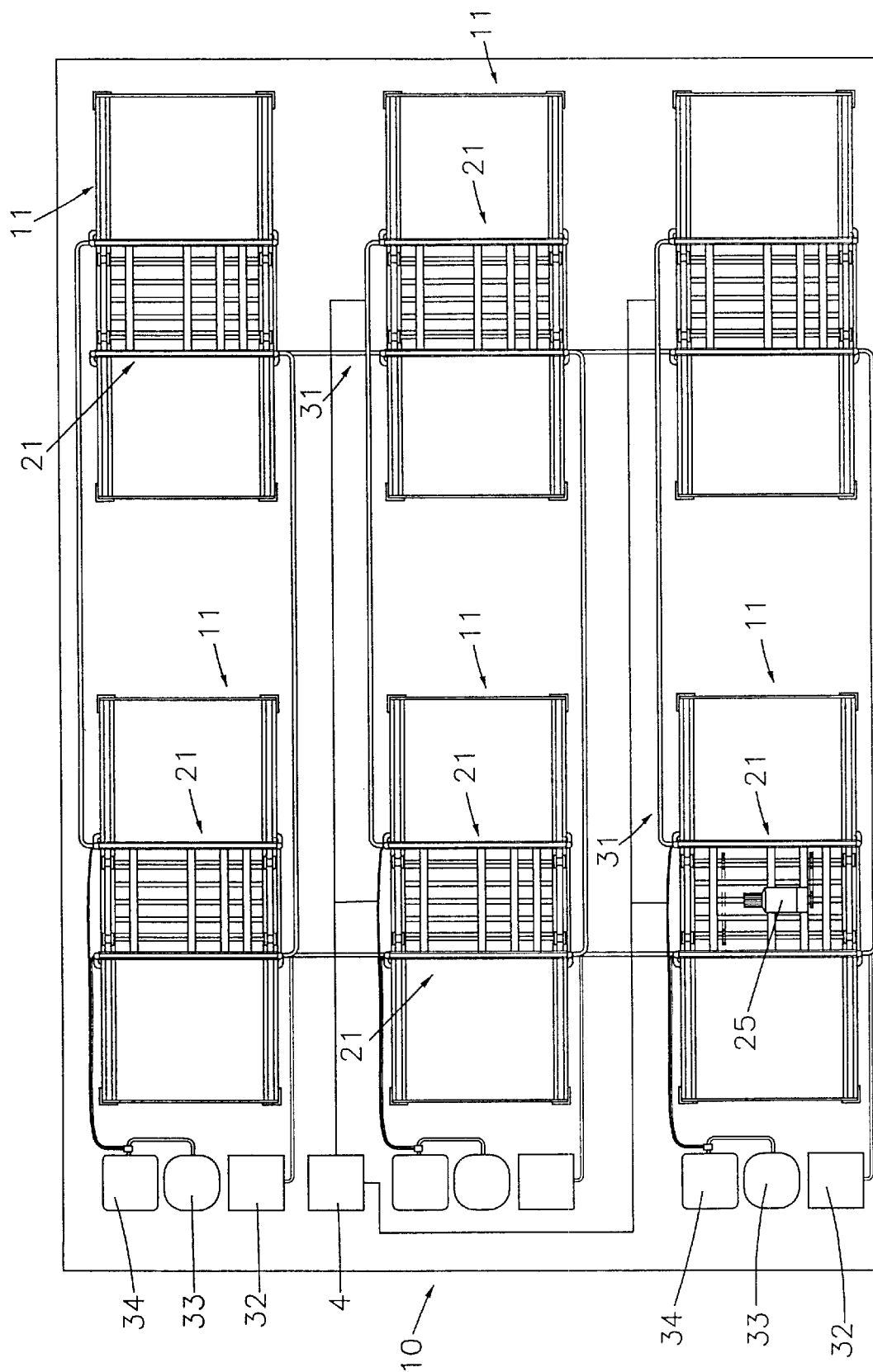
FIG. 1 is a top view of an artificial cultivating room in accordance with the present invention.
Figure 2:
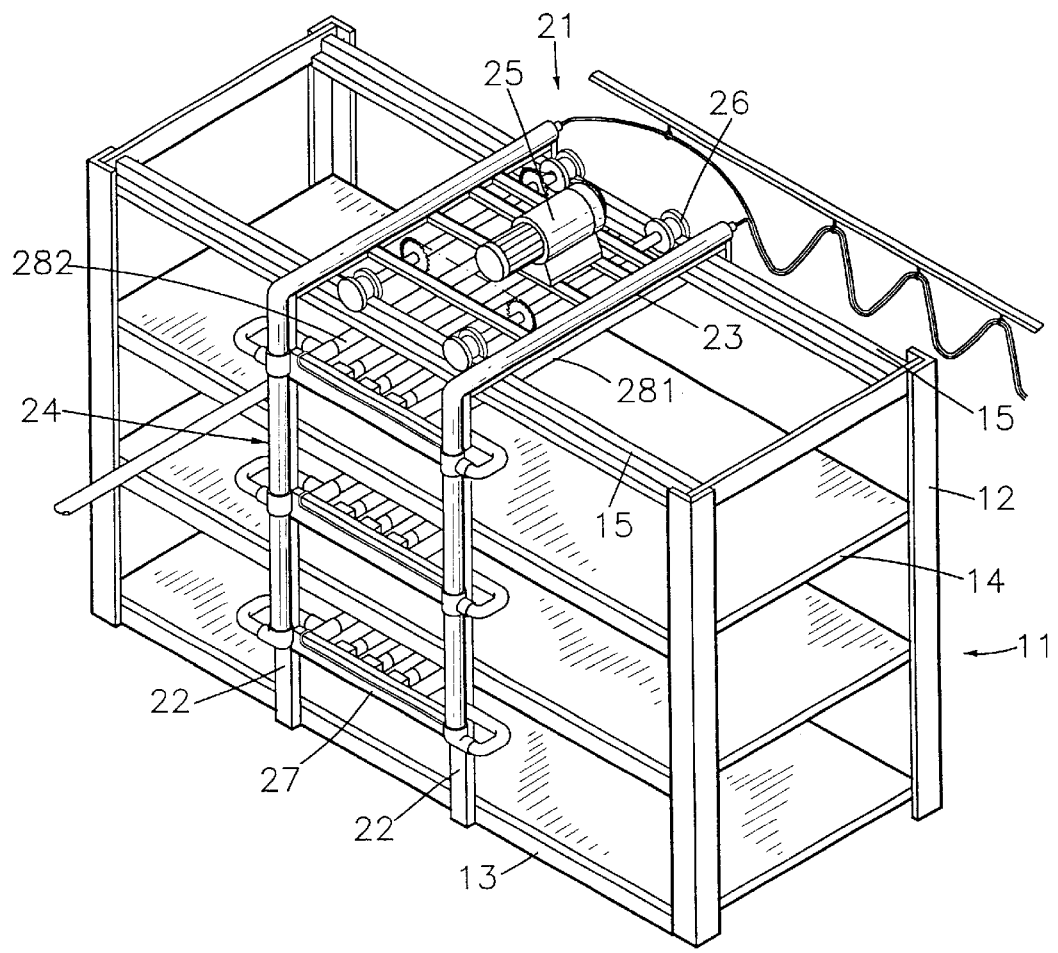
FIG. 2 is a perspective view of a cultivating frame in the artificial cultivating room in accordance with the present invention.
Figure 3:
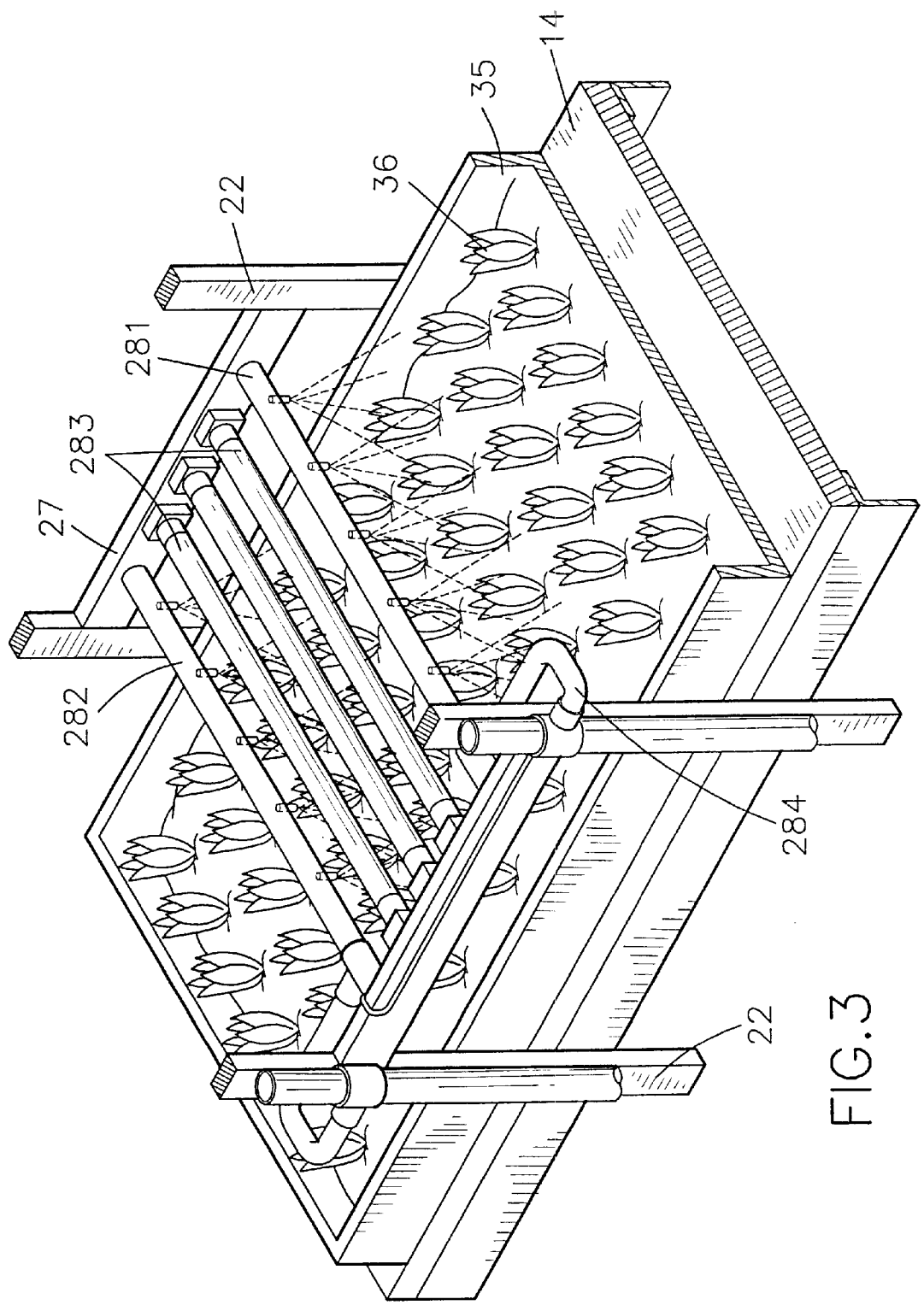
FIG. 3 is a partial perspective view illustrating a growth plate in the cultivating frame.
Figure 4:
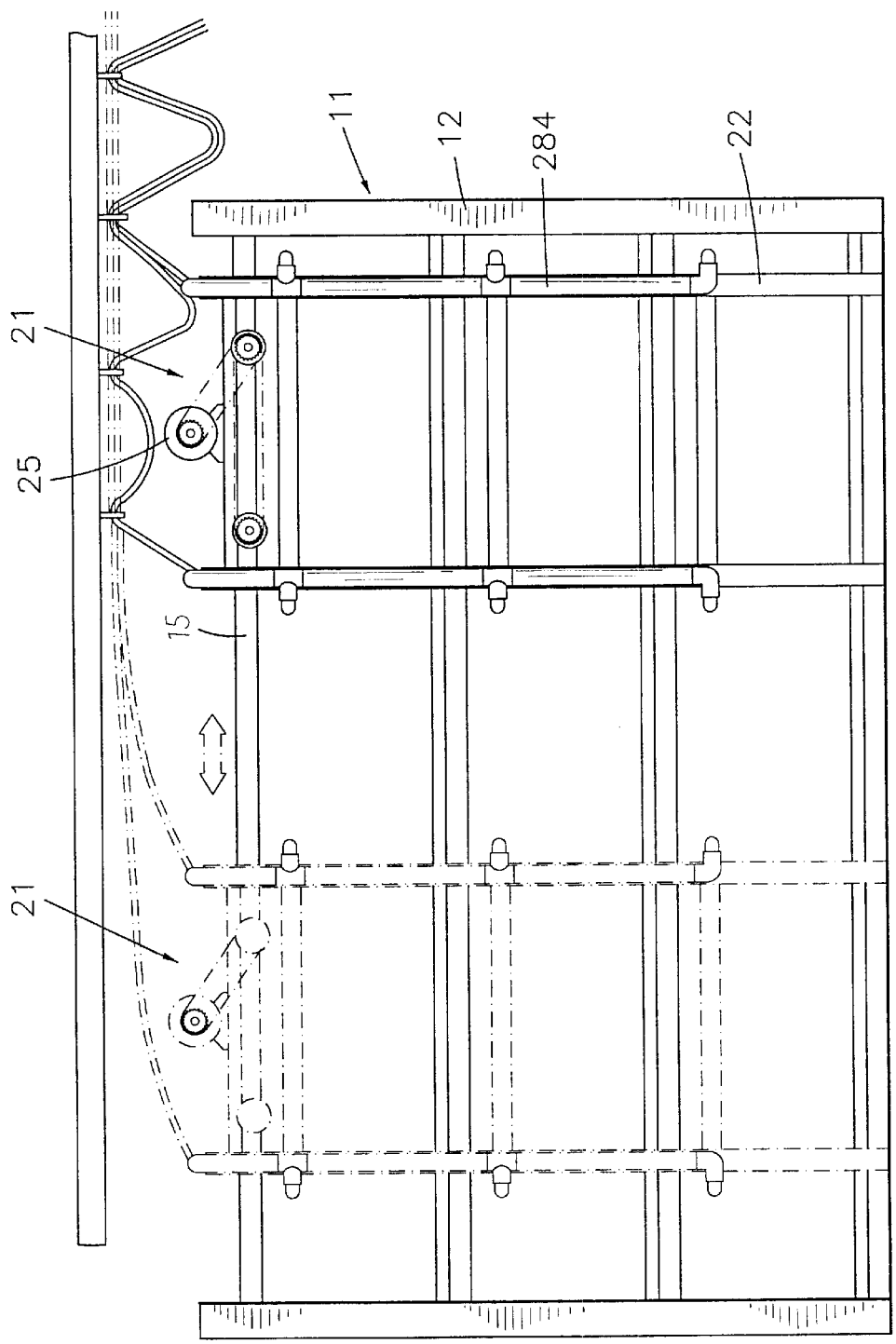
FIG. 4 is a schematic side view of the cultivating frame.

Referring to FIGS. 1 through 5 and initially to FIGS. 1 and 2, an artificial cultivating room in accordance with the present invention is designated by reference numeral "10" and generally includes a plurality of cultivating frame 11 and a plurality of cultivating devices 21 for each cultivating frame 11. The artificial cultivating room 10 may be constructed as a non-transparent, isolated room to prevent transmission of light into the room 10. Each cultivating frame 11 is a multistory frame comprising a plurality of vertical beams 12, a plurality of horizontal beams 13, and a plurality of vertically spaced growth plates 14. Each two adjacent growth plates 14 have a space therebetween for plant growth. In addition, each cultivating frame 11 includes a horizontal track means 15 on a top thereof Each cultivating device 21 includes a plurality of vertical rods 22 and a plurality of horizontal rods 23 that together form an inverted U-shaped movable frame 24. The movable frame 24 includes a number of wheels 26 engaged with and guided by the track means 15. A motor 25 is provided to drive the wheels 26 so as to enable the frame 24 to move relative to the fixed cultivating frame 11, as shown in FIG. 4.

Figure 5:
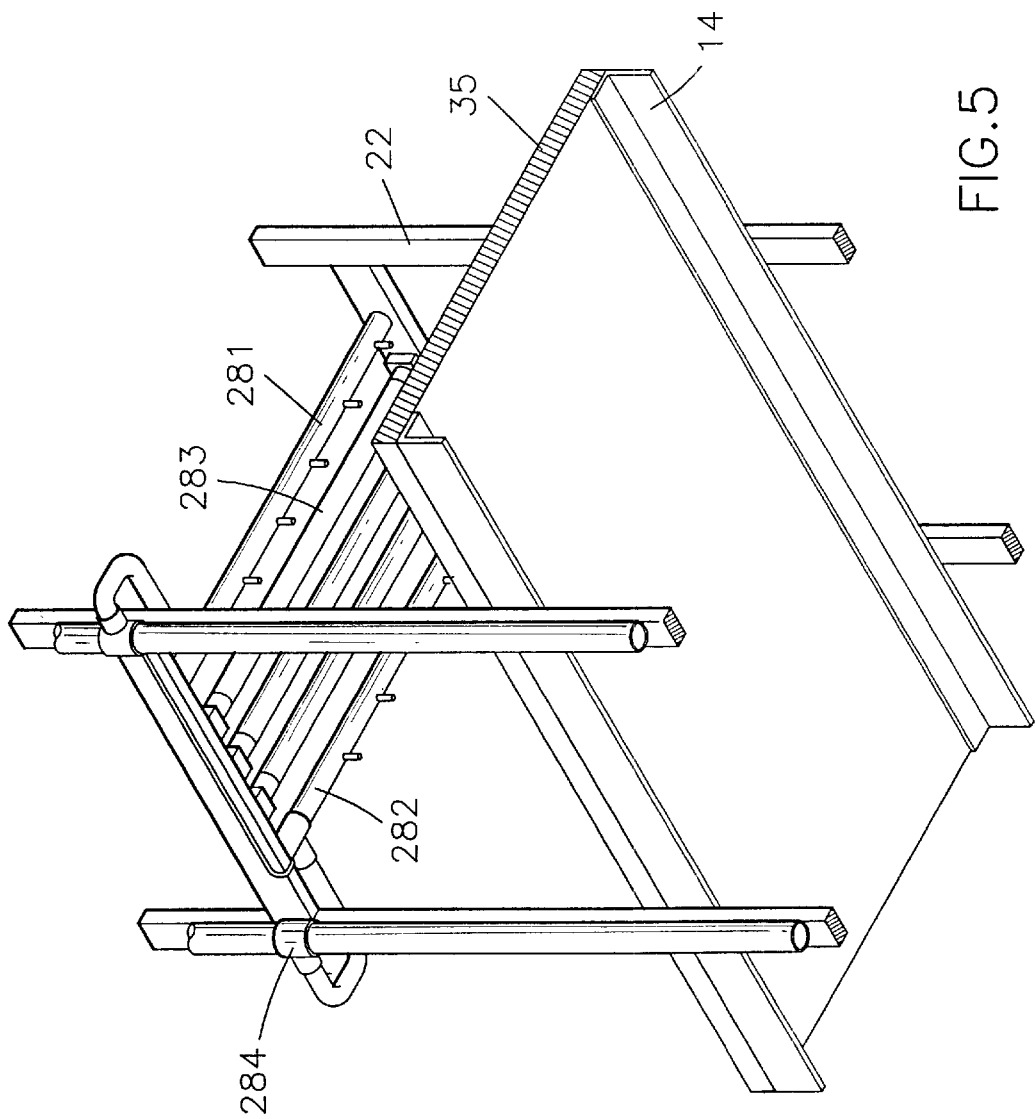
FIG. 5 is a partial perspective view illustrating an upper part of the cultivating frame.

Referring to FIGS. 2, 3, and 5, each cultivating device 21 further includes a plurality of pairs of support plates 27, each pair of support plates 27 having a water tube 281, a nutrition tube 282, and at least one sun lamp 283 held between the support plates 27 for each growth plate 14. The water tube 281 is communicated with a water source 32 (FIG. 1). The nutrition tube 282 is communicated with a fertilizer tank 33 and a pesticide tank 34 (FIG. 1). Referring to FIGS. 2, 4, and 5, guide tubes 284 are provided to interconnect adjacent tubes for supplying the same substance (e.g., water, fertilizer, or pesticide). The guide tubes 284 may be provided with valves for controlling opening and closing of each tube 281, 282, thereby supplying the same amount of substance to each growth plate via associated tubes 281 and 282 at different time.

As illustrated in FIG. 1, the cultivating frames 11 can be connected by piping 31 such that water sources 32, fertilizer sources 33, and pesticide sources 34 are available for all cultivating frames 11.

Referring to FIG. 3, a waterproof layer 35 is provided between each growth plate 14 and the plants 36 on the growth plate 14. For each cultivating frame 11, the growth plates 14 may be used to rear different plants or identical plants.

Referring to FIG. 1, a computer 4 is connected to each cultivating frame 11 via cables (not labeled) to control movement of each cultivating frame 11 and supply timing of sunlight, water, fertilizer, and pesticide for each growth plate 14. The computer 4 is programmed to proceed with the above-mentioned control in response to different needs of different plants on the growth plates 14 of each cultivating frame 11. Thus, appropriate sunlight, water, fertilizer, and pesticide is given in this green house in accordance with the present invention. In addition, temperature and moisture in the artificial cultivating room can be automatically controlled by the computer in response to the plants to be reared.

According to the above description, it is appreciated that the artificial cultivating room (green house) of the present invention may provide required substances at proper time to plants (e.g., vegetables and rice) to be cultivated. The plants are reared and harvested in an artificial environment such that natural bug attack and weather and seasonal condition that may affect the growth and harvest of the plants are avoided. In addition, the plants can be cultivated in the vertical direction without being restrained by the limited land area. Production and quantity of the plants can be planned and assured. Labor work can also be largely reduced, as the computer may take over most of the work.

Although the invention has been explained in relation to its preferred embodiment, it is to be understood that many other possible modifications and variations can be made without departing from the spirit and scope of the invention as hereinafter claimed.

What is claimed is:

1. An artificial cultivating room comprising:
   an isolated cultivating room;
   at least one cultivating frame mounted in the cultivating room and including a plurality of vertically spaced growth plates for rearing plants thereon, said at least one cultivating frame including a track means on a top thereof;
   at least one cultivating device movable relative to said at least one cultivating frame, said at least one cultivating device including a water tube, a nutrition tube, and a sun lamp for each said growth plate; and
   means for moving said at least one cultivating device relative to said at least one cultivating frame, and including a plurality of wheels mounted on said at least one cultivating device and engaged with the track means.

2. The artificial cultivating room as claimed in claim 1, wherein said at least one cultivating device includes an inverted U-shaped frame constructed by a plurality of vertical rods and a plurality of horizontal rods, the inverted U-shaped frame further including a plurality of pairs of support plates for supporting the water tube, the nutrition tube, and the sun lamp for each said growth plate.

3. The artificial cultivating room as claimed in claim 1, wherein the water tubes of said at least one cultivating device are intercommunicated by a guide tube, the guide tube including valve means for controlling opening and closing of the water tubes.

4. The artificial cultivating room as claimed in claim 1, wherein the nutrition tubes of said at least one cultivating device are intercommunicated by a guide tube, the guide tube including valve means for controlling opening and closing of the nutrition tubes.

5. The artificial cultivating room as claimed in claim 1, further comprising a computer for controlling movement of said at least one cultivating device and supply timing of the water tubes, the nutrition tubes, and the sun lamps.

6. An artificial cultivating room comprising:
   an isolated cultivating room;
   a plurality of cultivating frames mounted in the cultivating room, each said cultivating frame including a plurality of vertically spaced growth plates for rearing plants thereon, and including a track means on a top thereof;
   a plurality of cultivating device each provided for an associated said cultivating frame and movable relative to the associated cultivating frame, each said cultivating device including a water tube, a nutrition tube, and a sun lamp for each said growth plate of the associated cultivating frame; and
   means for moving each said cultivating device relative to the associated cultivating frame, and including a plurality of wheels mounted on each said cultivating device and engaged with the track means of the associated cultivating frame.

7. The artificial cultivating room as claimed in claim 6, wherein each said cultivating device includes an inverted U-shaped frame constructed by a plurality of vertical rods and a plurality of horizontal rods, the inverted U-shaped frame further including a plurality of pairs of support plates for supporting the water tube, the nutrition tube, and the sun lamp for each said growth plate.

8. The artificial cultivating room as claimed in claim 6, wherein the water tubes of each said cultivating device are intercommunicated by a guide tube, the guide tube including valve means for controlling opening and closing of the water tubes.

9. The artificial cultivating room as claimed in claim 6, wherein the nutrition tubes of each said cultivating device are intercommunicated by a guide tube, the guide tube including valve means for controlling opening and closing of the nutrition tubes.

10. The artificial cultivating room as claimed in claim 6, wherein all of said cultivating devices are moved simultaneously.

11. The artificial cultivating room as claimed in claim 10, wherein all of the water tubes are intercommunicated.

12. The artificial cultivating room as claimed in claim 10, wherein all of the nutrition tubes are intercommunicated.

13. The artificial cultivating room as claimed in claim 10, wherein the sun lamps are electrically connected.

14. The artificial cultivating room as claimed in claim 6, further comprising a computer for controlling movement of each said cultivating device and supply timing of the water tubes, the nutrition tubes, and the sun lamps.

* * * * *